United States Patent [19]
Harris et al.

[11] Patent Number: 6,105,673
[45] Date of Patent: Aug. 22, 2000

[54] PATCHING OF INJECTION AND PRODUCTION WELL ANNULAR CASING LEAKS FOR RESTORING MECHANICAL INTEGRITY

[76] Inventors: Todd K. Harris; Kenneth E. Harris, both of 1015 Whittle St., Olney, Ill. 62450

[21] Appl. No.: 09/062,402

[22] Filed: Apr. 20, 1998

Related U.S. Application Data

[63] Continuation-in-part of application No. 08/743,242, Nov. 5, 1996, Pat. No. 5,954,132.
[51] Int. Cl.$^7$ .................................................. F21B 33/13
[52] U.S. Cl. .......................... 166/277; 166/293; 166/295
[58] Field of Search .................................... 116/276, 277, 116/292, 293, 294, 295

[56] References Cited

U.S. PATENT DOCUMENTS

| | | | |
|---|---|---|---|
| 1,548,012 | 7/1925 | Dunn | 166/277 |
| 5,788,421 | 8/1998 | Higashi et al. | 166/292 |

*Primary Examiner*—William Neuder
*Attorney, Agent, or Firm*—Baker & Daniels

[57] ABSTRACT

A system of patching single and multiple casing leaks that occur in an injection well annulus, where there is direct communication from an outermost casing string to an original open-hole wellbore and adjacent earth strata. Preferred in this pumping system is a four-stage pump process employing four separate types of fluids. The first Injection Stage utilizes either $H_2SiO_3$, $Na_2$ in a solution of water forming $Na_2SiO_3 + H_2O$ (Sodium Metasilicate) or $Na_2O*SiO_2$ (Sodium Silicate) in water. The second Injection Stage utilizes $CaCl_2$ solution in water. These two solutions react in a double replacement chemical reaction to yield an aqueous phase and a solid phase. The third Injection Stage is then implemented, the same including a bentonite/high-density, high-solids, concentrated slurry additionally containing large plugging materials suspended therein. The Fourth Stage utilizes covalently bonded $N_2$ in a gaseous state. After injection of the first Three Stages, $N_2$ pressure is applied and the staged patching materials are moved into place at the casing hole(s), thread leak, packer leak, or perforation. Upon restriction, the materials react by the resulting combination and shear, at which point a filtration process begins. Filtration continues until the contents of all of the stages have completed their plating action and a tight impermeable seal is in place at the problem area.

16 Claims, 1 Drawing Sheet

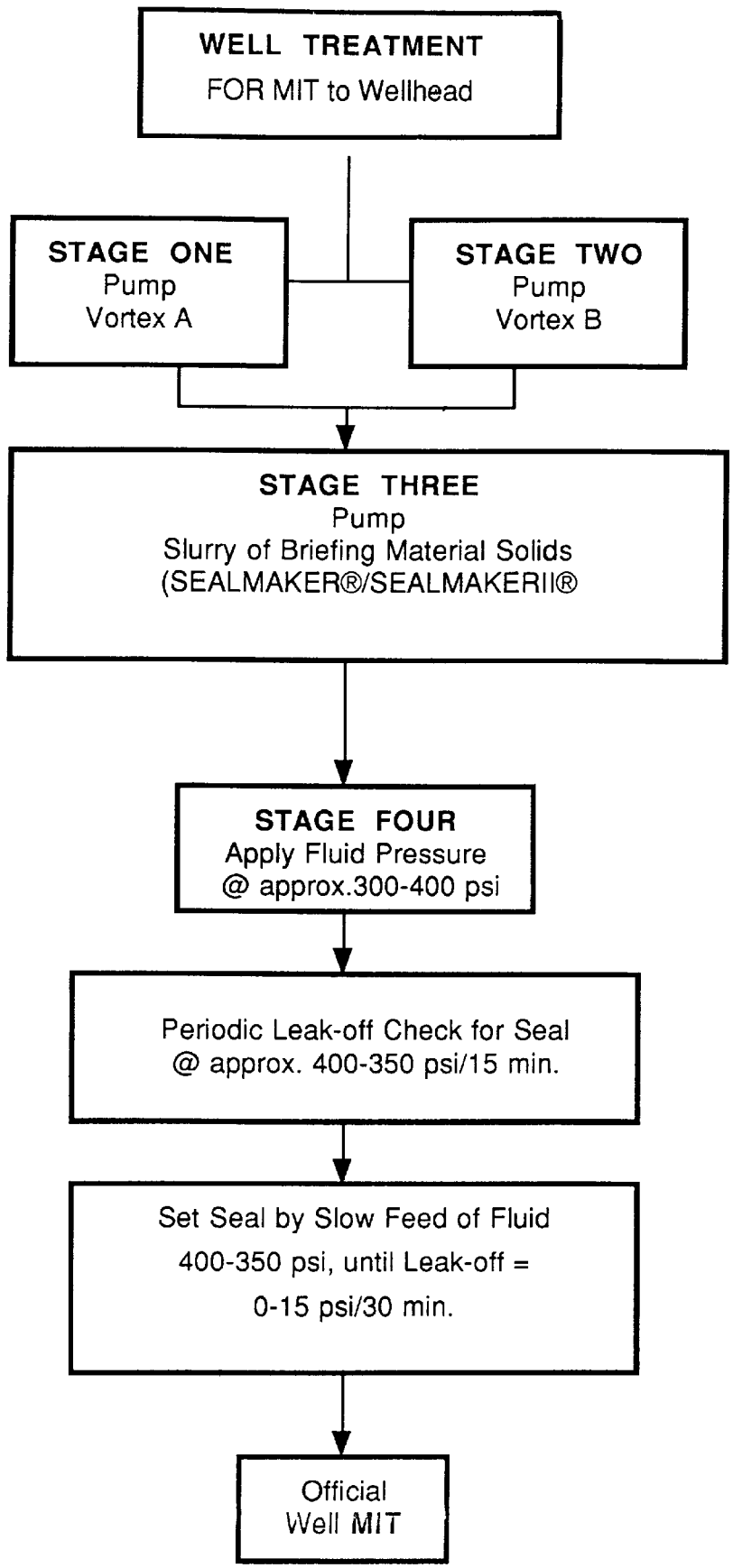

PATCHING OF INJECTION AND PRODUCTION WELL ANNULAR CASING LEAKS FOR RESTORING MECHANICAL INTEGRITY

RELATED APPLICATIONS

Continuation-in-part of patent application Ser. No. 08/743,242 filed Nov. 5, 1996, Same title, now U.S. Pat. No. 5,954,132 issued Sep. 21, 1999.

BACKGROUND OF THE INVENTION

1. Field of the Invention

The invention relates to a wellbore treatment process wherein the wellbore is utilized for injection or disposal of a fluid into a subterranean formation.

2. Description of Related Current Art

Injection and disposal wells are utilized throughout the world to reinject produced waters from hydrocarbon recovery to systematically enhance recovery of those hydrocarbons by volumetric production of re-injected waters as well as to maintain pressure on those producible zones. Disposal wells are utilized to dispose of liquid wastes into an underground containment reservoir. An injection well is typically constructed as follows:

A surface string is usually run from the surface through all fresh water reservoirs for protection. Many older wells do not have protective pipe all the way through known fresh water zones. Inside of the surface string is a production string of pipe which is typically 7", 5½", or 4½" diameter steel casing pipe. This production string is run from the surface to the production zone. The casing is cemented in place. This casing is then perforated to allow fluid injection/disposal into that formation. An injection string of tubing typically 2½" is then run into the well inside of the production casing. A packer is connected to this tubing and is used to isolate or "pack-off" the injection interval. Pressure from injection will remain below this packer and on the inside of the tubing string. The annulus therefore will have no pressure during normal injection/disposal operations. A wellhead connection is utilized at the surface to hang the tubing and hold tension on the injection packer below. The wellhead typically has two (2) two-inch female pipe connections for access to the annulus each located 180° to one another. The top of the wellhead is designed to accept the tubing and contains slips to hang the tubing from. A flat plate lays on top of the slips and inside of the wellhead. A rubber packing ring is then placed on top of this plate with another ring laid on top of the rubber for compressing the rubber. A special lid fits over this assembly and when tightened, compresses the rubber between the two rings on top of the slips. When the rubber is compressed the wellhead is then packed off and no pressure can escape this connection. Water is then injected from the surface through the tubing and isolated below the packer leaving an annular space between the tubing and the production casing above the packer which can be accessed through the wellhead connections. This annulus between the casing and tubing must be periodically checked to ensure the mechanical integrity of the annulus above the packer.

State regulations address required Mechanical Integrity Testing (MIT) of this annular space in their Underground Injection regulations intended for fresh water zone protection. For example, the State of Texas requires in Section 3.9 Rule 9. DISPOSAL WELLS (Amended Effective April 1, 1982) Paragraph (11) TESTING.

(A) Before beginning disposal operations, the operator shall pressure-test the long string casing. The test pressure must equal the maximum authorized injection pressure or 500 psig, whichever is less, but must be at least 200 psig.

(B) Each disposal well shall be pressure-tested in the manner provided in subparagraph (A) of this paragraph at least once every 5 years to determine if there are leaks in the casing, tubing, or packer. The Director may prescribe a schedule and mail notification to operators to allow for orderly and timely compliance with this requirement.

According to the Railroad Commission of Texas that once the starting test pressure is stable, a 10% variation from initial pressure is allowed throughout a 30-minute test interval in order to pass the Mechanical Integrity Test (MIT).

Under the State of Illinois requirements outlined in 62 ILLINOIS ADMINISTRATIVE CODE § 240.780 Reporting Requirements for Class II UIC Wells subpart g) Pressure Test:

The following pressure test shall be performed on Class II UIC Wells to establish the internal mechanical integrity of the tubing, casing and packer of the well. The permittee shall contact the District Office in which the well is located at least twenty-four (24) hours prior to conducting a pressure test to enable an inspector to be present when the test is done . . .

1) Pressure Test

The casing-tubing annulus above the packer shall be tested under the supervision of the Department at a minimum pressure differential between the tubing and the annulus of 50 PSIG for a period of 30 minutes. In addition, the casing-tubing annulus starting pressure shall not be less than 300 PSIG and may vary no more than five (5) percent of the starting test pressure during the test. The well may be operating or shut in during the test.

There is large proportion of underground injection/disposal wells that will not pass the required state tests due to casing holes, thread leaks, packer leaks, etc. The most commonly used and the most widely accepted method of repairing casing holes is cement squeezing. Hydraulic cements such as Portland or pozzolan cements are typically used in this type of application. The composition of the cement slurries which are blended incorporate water, a hydraulic cement, and an endless array of possible additives to alter the properties of the cement for individual applications. When cement is emplaced against a porous medium i.e. earth strata, the cement loses water into the porous medium. When a significant amount of water or filtrate loss occurs, the cement characteristics degrade, resulting in poor quality or even possible failure of the cement to repair the casing section. In addition, the process is expensive. Other commonly used applications include polymer crosslinking by applying a solute crosslinking ion such as chrome, boron, titanium, etc. into a solvent of polymer consisting of guar, xanthan gum, HEC, CMC, PHPA, polyacrylamides, etc. and pumping the solution into the annulus allowing the crosslink to develop into a gelled solution that effectively plugs the annulus and prevents fluid flow inward or outward to the casing. Additional methods include simple injection of gellable solutions, calcium carbonate in graduated sizes, and even in some cases, basic food-grade cornmeal which enlarges as it absorbs water.

A practical economical method is needed to patch casing leaks on injection wells that requires no work-over rig, that sacrifices no hole diameter, that inhibits corrosion, that will not jeopardize packer retrieval, and most importantly, quickly and effectively, restores mechanical integrity to those existing wells to allow them to pass MIT.

DESCRIPTION OF RELATED PATENT ART

| INVENTOR | DATE | PAT. NO. | DESCRIPTION |
|---|---|---|---|
| Baker et al. | 1984 | 4,462,836 | Cement Composition |
| Roark et al. | 1987 | 4,706,755 | Fluid Loss Control |
| Burdge et al. | 1988 | 4,730,674 | Plugging A Tubing/ Casing Annulus |
| Bennett et al. | 1988 | 4,754,810 | Method For Patching Casing Leaks |
| Kirkland et al. | 1988 | 4,784,693 | Cementing Composition |
| Cowan | 1991 | 5,016,711 | Cement Sealing |
| Cowan et al. | 1991 | 5,020,598 | Process For Cementing A Well |
| Himes et al. | 1993 | 5,191,931 | Fluid Loss Control Method |
| Johnson et al. | 1993 | 5,228,524 | Fluid System for Controlling Fluid Losses |
| Cowan | 1994 | 5,275,654 | Cement Sealing |
| Cowan | 1996 | 5,484,020 | Remedial Wellbore Sealing |

SUMMARY OF THE INVENTION

The present invention provides a system for patching casing leaks of any type, more particularly designed for an injection well annulus. These leaks, due to regulation and subsequent MIT failure, can interrupt hydrocarbon recovery which translates into lost revenues for the operator. Due to expensive alternative methods, economics may require these wells to be plugged prematurely. Internal tubing failure could also occur due to the corrosive nature of fluids which can freely enter the annular wellbore through existing holes whereby these fluids may react with the injection tubing. This type of reaction may lead to separation of the tubing and packer requiring the well to be plugged, if not retrievable.

The objectives of the present invention are achieved by staging multiple combinations of reactive aqueous fluids and slurries in a predetermined volume and order, via a unique pumping technique. The combination of the aqueous fluids and slurries can be staged to remain independent of one another, until restriction is encountered at the locus of a casing leak.

Upon restriction, the first two stages combine, thereby creating a double replacement chemical reaction. Two (2) aqueous phase chemicals thus react therein to yield a single aqueous phase and a distinctly different solid phase, the latter being characterized as possessing an extremely high filtration rate when pressed.

Alternatively, simultaneous injection of all solutions/slurries may be effected to provide optimal treatment design for specific well conditions. Individual set-up times of the chemical solutions may thus be controlled. The complementary stages are defined below.

In the instantaneous reaction mode of the invention, the first two stages combine upon restriction, thereby creating a double replacement chemical reaction. Two aqueous phase chemicals react therein to yield a single aqueous phase with a subsequent distinctly different solid phase, the latter being characterized as possessing an extremely high filtration rate when pressed. The third stage, performing several functions follows: In this stage, one utilizes a high concentration of flake, fiber, and granular bridging materials for large and multiple holes. It likewise provides additional high filtration materials to fill large, void spaces. It provides assorted micro-sized solids for additional plugging and for filling micro-voids in the structure, and it provides independent filtrate reducers to achieve permanent plate-off and a completed seal. Moreover, it can provide for corrosion control. The fourth and final stage exerts the pressing forces required to meet the objective in the invention. A controlled filtration process continues through multiple filtration mediums, each possessing unique characteristics in this regard. As the filtration process progresses, the seal becomes increasingly competent. Field testing has thus proven that a seal can be achieved as early as stage one in the process, with no further stages required. Whereas, this is not typical, it is attainable.

The chemical reactions described herein can also be modified to provide delayed reaction by modifying the chemical composition of the two-stage, aqueous phase solutions. In addition it is possible to combine the third stage with the first two-stage aqueous solutions as a carrying medium for the bridging material solids described in the third stage. By varying the amount, size, shape, composition, and assortment of such third-stage solids, and the order of injection of those solids in conjunction with the first two aqueous solutions, one can effectively manipulate the process to patch, nearly, the entire array of casing leaks that may occur. The solids content of the third stage contributes significantly in patching severe holes. At the other extreme, very small holes which will not permit solids to pass, can be sealed effectively with the first two aqueous solutions only wherein these solutions are able to pass through micro-sized holes.

This overall process provides a distinct advantage over commonly utilized leak control methods which are known in the art. For example, no work-over rig is required for this method of restoring mechanical integrity. Injection does not have to be interrupted for this performance herein. Annular residual of the treatment will remain fluid, thereby acting as a high quality packer fluid. This residual fluid remains as a protective barrier should a tubing leak develop and subsequent inadvertent pressuring of the annulus result.

As indicated above, the 300 PSI application is a multiple staged process which utilizes four separate types of fluids. The first two fluids simply combine to create a chemical reaction to yield a liquid phase and a solid phase. The solid phase is characterized as possessing an initial high filtration rate when pressed. This filtration characteristic allows water to be pressed out and a solid crystalline structure to form, depositing the crystalline structure at the locus of filtration. A slurry containing selected sizes, shapes, and compositions of solids is used to complete a bridge, or, to aid in developing a bridge in extreme cases for the crystalline structure to form on. With the well shut in from atmospheric conditions, fluid is used to maintain pressure on the materials to continue forcing water from those bridging materials, becoming increasingly intact as the process continues. When fluid can no longer be pressed from the structure, the process is complete with a tight impermeable seal in place at the point of restriction, either internal or external to the casing, thus precluding further fluid penetration through it. The well at this point is pressured to the regulatory pressure and the state inspector is called to the well for testing and approval.

DESCRIPTION OF THE DRAWINGS

The flow chart depicts the four-stage method in its preferred sequence.

DETAILED DESCRIPTION OF THE PREFERRED EMBODIMENTS

The invention requirement begins with the need to pump solution into an annulus that may or may not contain fluid, and, that may or may not build pressure upon injecting fluid into the annulus. One primary constraint, especially in older wells that have casing problems, is further degradation of that casing when hydraulic force is applied during the pumping stage of the treatment cycle. For this particular problem a high pressure centrifugal pump is used such that it may exert the load at approximately equivalent pressure required for the MIT. To practice this preferred form of invention one utilizes an Ingersoll-Rand HOC2 1½"×3"×13" centrifugal pump or equivalent, capable of pumping to 365 psig. In effect, the possibility of hydraulic overload, and subsequent pipe failure, due to exceeding the mechanical limitations of the casing, is reduced by virtue of the unique output of the centrifugal pump. A second advantage in utilizing this type of centrifugal pump resides in its ability to pump large solid sizes, for example, the HOC2 can pump solids up to ½" diameter. This pump system ensures ones ability to pump into an annulus, according to the invention, with a "set" packer, yielding a high margin of safety, not to exceed mechanical limitations of the existing casing. For situations where casing failure is not of concern, where large solid sizes are not required or where additional pressure is required to pump into the annulus, for any reason, a pump of another type such as a duplex pump, a triplex pump, a gear pump, a progressive cavity pump, etc., may be used to practice the invention. The method is initiated by rig up of the pumper. See the chart.

1 STAGE ONE: VORTEX B $Na_2SiO_3$ or $Na_2O*SiO_2$ $Na_2SiO_3$ or $Na_2O*SiO_2$ is blended to achieve an optimum fresh water solution. Field testing has concluded that in VORTEX B, a density of 75.55 Lb/Cu Ft is an optimal concentration for combination with a $CaCl_2$ solution of 70.31 Lb/Cu Ft. $Na_2/SiO_2$ ratios can be adjusted as required for use with the following VORTEX A solutions, to achieve an array of set times on the resulting chemical reactions, as well as hydrolysis that occurs. Density of the VORTEX B solution may also be varied, for use with the other components of VORTEX A.

EXAMPLE 42 cc's $H_2O$ combined with 32 cc's sodium silicate @ 12.7 lb/gal solution to yield 74 cc's 10.2 lb/gal sodium silicate with an $SiO_2/Na_2O$=2.00 Added 1 cc emulsifier w/6.5 cc's Dimethyl Glutarate (DMG) @ 99.0% by weight Dimethyl ester content. This is a 7.98% DMG solution by volume and a 39.26% sodium silicate solution by volume. Water volume is 51.53%. Emulsifier volume is 1.23%. Hydrolysis began @ 53 minutes. Hydrolysis was complete @ 2 hours. The hydrolyzed silica was then pressed @ 180# through an American Petroleum Institute (API) standard ½ area filter press yielding an initial filtrate (water loss) of 97.6 cc per min.

Dimethyl Glutarate effectively controlled the set time of the sodium silicate solution at a predictable time interval. Additionally the DMG yielded results, after hydrolysis of the solutions, which are identical to the instantaneous reaction of a calcium chloride solution and a sodium silicate solution which forms the solid phase calcium silicate. The DMG can effectively be substituted for the Vortex A $CaCl_2$ solution in accordance with the invention.

2 STAGE TWO: VORTEX A $CaCl_2$ $CaCl_2$ is added to a solution of fresh water. Field test results have concluded that a density of 70.31 Lb/Cu Ft is an optimal concentration. Whereas density may vary, nonetheless, increases in density simply result in a break-over, due to saturation of the next reacting stage, thereby providing an excess of $CaCl_2$ which un-reacted, produces only excess $H_2O$ in this stage. As indicated, this initial stage is termed VORTEX A. Additional known solutions herein may be utilized in place of $CaCl_2$ either individually or in combinations. These include solutions, but are not limited to one or more of the following in varying concentrations:

Barium Chloride; Hydrochloric acid; Sulfuric acid; Acetic Acid; Dimethyl Ester; Dimethyl Succinate; Dimethyl Glutarate; Dimethyl Adipate; Glyoxal, or any acid capable of producing a stable reaction with any of the coactive stages.

3 STAGE THREE: SEALMAKER/SEALMAKER II/SEALMAKER III@

The Third Stage, also identified as the SEALMAKER® Stage, may consist of multiple combinations of assorted solid materials all of which as a slurry can contribute significantly to the invention process of sealing a casing leak. The components of this stage have been varied and field tested and are known to be significantly effective in the sealing process herein. The Stage One and Stage Two phases have been tested as the carrying medium for this SEALMAKER® Stage and although the preceeding two Stages are efficient at suspending the required solids, they tend to diminish some of the initially desirable filtration characteristics therein, thus reducing some of the potential sealing effectiveness, versus being carried as this SEALMAKER® Stage which may be slurried in the below-listed concentrations within the carrying medium:

SEALMAKER III®
  25 Lb/Bbl Bentonite API 200 Mesh Montmorillonite; NaOH added to Increase pH to 11.5+; Biocide/Corrosion Inhibitor @ 1% solution; 12.5 Lb/Bbl Cellophane ¼", ⅜", or ½" cut; 60 Lb/Bbl Calcium Carbonate; ½ Lb/Bbl Calcium Hydroxide The above concentrations may be varied as needed for individual applications. Cellophane may be substituted with several types of commonly known Lost Circulation Materials (LCM), i.e. Multi-Seal, Kwik-Seal, Cottonseed Hulls, Cedar Fiber, Nut Shells, Mica, etc. Most types of the wood LCM will require additional preservative to prevent bacterial degradation. The Calcium Carbonate may be substituted by Barium Sulfate or be used in combination with Calcium Carbonate at any concentration. The multitude of other insoluble agents that will provide additional bridging effectiveness, as does the Calcium Carbonate or Barium Sulfate, are too numerous to list. Therefore any substantially insoluble or relatively insoluble solid could be substituted i.e. ground silica or silica flour. The solids content, density, combination, shape, size and composition determine the overall efficiency of this SEALMAKER® slurry. The carrying medium may also be altered to use other viscosifying agents. These include, but are not limited to: Attapulgite, Diatomaceous Earth, Polymers, Copolymers, etc. This SEALMAKER® Stage or Third Stage may alternatively be run as a first or second stage, to initiate bridging if pump-in characteristics indicate that particular need.

Initial Formulations:

| SEALMAKER ® | |
|---|---|
| 25 Lb/Bbl | Bentonite |
| 5 Lb/Bbl | Multi-Seal |
| 5 Lb/Bbl | Cottonseed Hulls |
| 5 Lb/Bbl | Cedar Fiber |
| 5 Lb/Bbl | Cellophane |

| | |
|---|---|
| 5 Lb/Bbl | Pecan Shells |
| 5 Lb/Bbl | Mica |
| 1 Lb/Bbl | Calcium Carbonate |
| 2 Lb/Bbl | Sodium Hydroxide |
| .1 Lb/Bbl | Calcium Hydroxide |
| 1% by vol | Biocide/Corrosion Inhibitor |
| SEALMAKER II ® | |
| 15 Lb/Bbl | Attapulgite |
| 35 Lb/Bbl | Diatomaceous Earth |
| 2 Lb/Bbl | Calcium Hydroxide |
| 5 Lb/Bbl | Multi-Seal |
| 5 Lb/Bbl | Cottonseed Hulls |
| 5 Lb/Bbl | Cedar Fiber |
| 5 Lb/Bbl | Cellophane |
| 5 Lb/Bbl | Pecan Shells |
| 5 Lb/Bbl | Mica |
| 1% by vol | Biocide/Corrosion Inhibitor |

The ability to adjust the carrying medium and concentrations and sizes of the Third Stage solids that must be transported, allows treatment conditions and ingredient concentrations to be adjusted as required for each specific casing leak that can occur, from small to large.

4 STAGE FOUR: Any Aqueous or Gaseous Fluid

To effect the sealing properties of the above formulations the following occurs: Vortex B is injected into the annulus followed by injection of Vortex A. Alternatively, Vortex A and Vortex B may be combined prior to injection into the annulus. This alternative is desirable when utilizing a time-delayed reaction of the First and Second Stage components. A pre-selected Third Stage SEALMAKER® solution containing the solids is then sequentially injected behind the first Two Stages or slurried into one of the first two stages. The SEALMAKER® Stage thus follows Vortex A and Vortex B down the annulus toward the hole. Pumping of the combined stages continues until the pre-determined volume is reached for placement or treatment design pressure is reached, 300 PSI treatments being typically designed for 350 psig. The required overall volume depends upon depth, size, and permeability of the casing leak. As the fluids move to and exit the casing hole they will travel until restriction is encountered. At the point of restriction, the fluids are forced to combine into an emulsion at which point an instantaneous reaction will occur. Alternatively, in a time-delayed reaction, the process, after placement, is temporarily halted until the design set-time is reached to allow hydrolysis to occur. In both cases a solid phase is created with a liquid phase entrained throughout. At this point fluid pressurization is continued or resumed. As surface pressure is increased, the pressing forces increase on the injected materials, thereby beginning a filtration process on the initial solid phase material which is $CaSiO_3$ or hydrolyzed silica, depending upon the Stage One—Stage Two aqueous phase fluids used. They both exhibit identical properties for purposes of this invention. An initial bridge begins to form at this point. Immediately behind is the SEALMAKER® slurry of the Third Stage which provides for additional bridging and final plating. The pumping phase herein will continue until an acceptable pressure increase or build-up is observed. When utilizing a centrifugal pump, pumping will continue until maximum output of the centrifugal is reached, at which point the HOC2 will stop moving fluid. Upon completion of the pumping phase the well is then isolated for injection by the Fourth Stage which will provide the required pressure to continue the filtration process on the injected materials. According to the invention, 300 PSI typically utilizes $N_2$ gas to maintain a uniform pressure on the well. Any other fluid can be used for this stage, liquid or gas.

Pressure is regulated and maintained either continuously or intermittently to continue the filtration process until all water is pressed from the Vortex A/B, leaving a tightly compacted slightly permeable $CaSiO_3$ or hydrolyzed silica structure externally, between the casing wall and the exposed open-hole wellbore face or mechanical restriction. This desired structure may also form internally, wherein the fluids cannot pass through a leak such as a minuscule thread leak. SEALMAKER® now begins the final plating action by depositing various sizes of bridging materials in, around, and on the crystalline bridging structure, thereby creating additional restriction. Bentonite/Attapulgite/Calcium Carbonate/Barium Sulfate/Cellophane continue to fill the microvoids in the $CaSiO_3$ structure. This filtration/deposition phase progressively plates until the crystalline bridging structure becomes impermeable. When filtration is complete, the material will have plated from the exposed open-hole wellbore inwards towards the casing wall. The plating process ends when the casing hole is sealed and no further filtration can occur. The patch is then in place, flush with the inside casing wall. Residual injected materials that remain in the annulus will act as a packer fluid resistant to corrosion and bacterial degradation.

EXAMPLES

The following specific examples illustrate the flexibility of this invention to perform successfully throughout a wide range of casing leak problems.

CASE 1

Location: Wayne County, Ill.

Problem: Conversion of producing oil well to injection well. Maximum annular pressure is 140 psi with total leak-off to zero (0) psi in 2 minutes. Well is 3250' with hole estimated at 1800'.

Solution: Rig up invention apparatus on location. Pump 300 PSI—SEALMAKER II®. Pressure is bumped at 300 psi with 126 gal Vortex A, 126 gal Vortex B, 504 gal SEALMAKER II®. Well is put on to nitrogen feed and pressure is increased to 365 psi. Continuous nitrogen feed is completed @ 18 hrs. Pressure is increased to 410 psi and shut in for test with no leak-off occurring. Well is circulated out to demonstrate sealing effectiveness of the invention. Packer and tubing is pulled, additional injection zone is perforated and new tubing and packer run into hole. Hole is then repressured under State of Illinois supervision and pressure is increased to 328 psi. Well passed MIT with no leak-off during the 30 minute test interval.

CASE 2

Location: Crawford County, Ill.

Problem: Saltwater disposal well in violation of State of Illinois regulation for failure to MIT. Currently disposing at least 2000 barrels/day. Well is 1300' with packer set at 950'. Well can be pressured to 70 psi at maximum injection rate of 5.0 barrels per minute with total leak-off in less than one minute.

Solution: Rig-up and pump 300 PSI-SEALMAKER II®. Pressure is increased to 200 psi with 168 gal Vortex A, 126 gal Vortex B, 210 gal SEALMAKER II®. Well is then isolated for nitrogen feed. Pressure is increased to 400 psi @ 5 hours. Well is shut in overnight. Pressure bled to 280 psi @ 15 hours. Pressure is increased to 310 psi and passed MIT with zero (0) psi leak-off during test interval.

CASE 3

Location: Wabash County, Ill.

Problem: Injection well under regulation will not pass MIT. Well is required for continued production on lease. Annular pressure can be increased to 50 psi and with continued rate at 50 psi, fluid migration into the surface pipe occurred. Packer is set below 1300'.

Solution: Rig-up and pump 300 PSI-SEALMAKER II®. Install valve on surface pipe for monitoring and controlling pressure on surface pipe. Pump 210 gal Vortex A, 210 gal Vortex B, 1250 gal SEALMAKER II®. Pumping pressure increased to 175 psi. Isolate well for nitrogen feed whereupon pressure is increased to 220 psi. Surface pipe pressure is bled to zero @ 2 hours and annular pressure is increased to 375 psi. Well is shut in @ 375 psi with no pressure at the surface pipe. At 72 hours, well passed MIT at 350 psi with no leak-off.

CASE 4

Location: Lawrence County, Ill.

Problem: Four injection wells will not pass MIT and under regulation violation by State of Illinois. Well 1 would pressure to 280 psi with 50 psi leak-off/30 minutes. Well 2 would pressure to 160 psi with 20 psi leak-off/30 minutes. Well 3 would pressure to 400 psi with communication to the surface inside of surface pipe. Leak-off was 280 psi/30 minutes. Well 4 would pressure to 300 psi with 25 psi leak-off/30 minutes.

Solution: Rig-up and pump 300 PSI-SEALMAKER II® on all four wells. Well 1: pumped 25 gal Vortex A, 25 gal Vortex B, 45 gal SEALMAKER II®. Well pressured to 300 psi, isolated to nitrogen and pressured to 350 psi. Well 1 passed MIT @ 18 hours. Well 2: pumped 42 gal Vortex A, 42 gal Vortex B, 84 gal SEALMAKER II®. Pressured to 300 psi, isolated to nitrogen, pressured to 365 psi and passed MIT @ 17 hours. Well 3: pumped 25 gal Vortex A, 25 gal Vortex B, 10 gal SEALMAKER II®. Well pressured to 300 psi and isolated to nitrogen. Pressured to 400 psi with no pressure back to the surface. Well passed MIT @ 16 hours. Well 4: pumped 20 gal Vortex A, 10 gal Vortex B, 10 gal SEALMAKER II®. Well pressured to 300 psi and was isolated to nitrogen. Pressured to 350 psi and well passed MIT @ 15 hours.

CASE 5

Location: Crawford County, Ill.

Problem: Injection well under regulation will not pass MIT due to perforations above injection packer.

Solution: Rig-up and pump 300 PSI-SEALMAKER II®. Pumped 126 gal Vortex A, 126 gal Vortex B, 126 gal SEALMAKER®. Well pressured to 100 psi and was isolated to nitrogen. Well pressured to 345 psi and passed MIT @ 24 hours.

CASE 6

Location: Gibson County, Ind.

Problem: Well was pulled to change injection interval. The packer was dropped when tubing was inadvertently backed off. After retrieval, perforating new zone and setting bridge plug on lower zone the well would pressure to 550 psi and leak-off was steady at 10 psi/minute to 200 psi. This would not pass MIT under regulation.

Solution: Rig-up and pump 300 PSI-SEALMAKER II®. Pumped 20 gal Vortex A, 10 gal Vortex B, and 10 gal SEALMAKER II®. The well was isolated to nitrogen and pressured to 575 psi. Well passed MIT @ 21 hours.

The 300 PSI method currently recorded has a 97.5% success rate more particularly 156 successful treatments and resulting MIT on 160 total attempts.

The present invention, described in detail in the foregoing preferred embodiments and demonstrated in its examples thereof, is subject to alterations and modifications by those skilled in the art. Such alterations and modifications inherent in the invention are encompassed within the scope of the invention as claimed.

We claim:

1. A method of patching leaks in a well casing having an annulus formed between said casing and a concentric tubing, said method comprising:

pressure injecting two reactive aqueous fluids into the annulus, at least one of said reactive aqueous fluids having a sodium component, said reactive aqueous fluids reacting to yield a solution having liquid phase and solid phase materials; and pressing said liquid phase materials from said solid phase materials, thereby depositing a filter cake on the casing at a casing leak.

2. The method of claim 1 including:

pressure injecting into the annulus a slurry comprising bridging material solids in an aqueous carrying medium.

3. The method of claim 2 including:

pressure injecting into the annulus a working fluid, said working fluid adapted to move said solution and said slurry to said casing leak to form a restriction, while creating a filtration effect.

4. The method of claim 3 including:

again pressure injecting a working fluid into the annulus, whereby filtration characteristics of said solution, said slurry, and said bridging materials develop a tightly compacted solid in and around said casing leak.

5. The method of claim 4, wherein said pressure injecting comprises centrifugal pumping.

6. The method of claim 4, wherein said step of again pressure injecting a working fluid into the annulus comprises pressure injecting $N_2$ gas.

7. The method of claim 4, wherein one of said reactive aqueous fluids is selected from the group consisting of calcium chloride; barium chloride; hydrochloric acid; sulfuric acid; acetic acid; dimethyl ester; dimethyl succinate; dimethyl glutarate; dimethyl adipate; and glyoxal.

8. The method of claim 7 wherein said slurry pressure injecting, and both said working fluid pressure injecting steps comprise centrifugal pumping.

9. The method of claim 7 wherein said step of again pressure injecting a working fluid into the annulus comprises pressure injecting $N_2$ gas.

10. The method of claim 1, wherein said reactive aqueous fluid having a sodium component is selected from the group consisting of $Na_2OSiO_2$ and $Na_2SiO_3$.

11. The method according to claim 4 wherein said step of pressure injecting a slurry into the annulus comprises injecting a bentonite slurry.

12. The method of claim 2 including:

injecting a working fluid into the annulus, thereby moving said solution and said slurry to said casing leak to form a restriction, while creating a filtration effect.

13. The method of claim 12 including:

applying working fluid pressure to the annulus, whereby filtration characteristics of said solution, said slurry, and said bridging materials develop a tightly compacted solid in and around said casing leak.

14. The method of claim 13 wherein said pressure injecting comprises centrifugal pumping.

15. The method according to claim 12 wherein said step of injecting a slurry into the annulus comprises injecting a high density bentonite slurry.

16. The method according to claim 15 including:

applying pressure whereby said solids are moved into place at the casing leak.

* * * * *